(12) United States Patent
Takano et al.

(10) Patent No.: US 12,516,486 B2
(45) Date of Patent: Jan. 6, 2026

(54) METHOD OF CONSTRUCTING FOUNDATION FOR STRUCTURE BODY

(71) Applicant: JGC CORPORATION, Kanagawa (JP)

(72) Inventors: Yoshiyuki Takano, Kanagawa (JP); Tadashi Hodohara, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 137 days.

(21) Appl. No.: 18/697,479

(22) PCT Filed: Mar. 17, 2022

(86) PCT No.: PCT/JP2022/012294
§ 371 (c)(1),
(2) Date: Mar. 31, 2024

(87) PCT Pub. No.: WO2023/175836
PCT Pub. Date: Sep. 21, 2023

(65) Prior Publication Data
US 2025/0003171 A1 Jan. 2, 2025

(51) Int. Cl.
*E02D 27/08* (2006.01)
*B28B 23/02* (2006.01)
*B33Y 80/00* (2015.01)
*B28B 1/00* (2006.01)
*B33Y 10/00* (2015.01)

(52) U.S. Cl.
CPC .............. *E02D 27/08* (2013.01); *B28B 23/02* (2013.01); *B33Y 80/00* (2014.12); *B28B 1/00* (2013.01); *B33Y 10/00* (2014.12); *E02D 2250/0007* (2013.01); *E02D 2250/0023* (2013.01); *E02D 2300/002* (2013.01); *E02D 2300/0021* (2013.01)

(58) Field of Classification Search
CPC ......... E02D 27/01; E02D 27/02; E02D 27/08; E02D 2250/0007; E02D 2250/0023; E02D 2300/002; E02D 2300/0021; B33Y 80/00; B28B 23/02
See application file for complete search history.

(56) References Cited

U.S. PATENT DOCUMENTS

2021/0107177 A1* 4/2021 Giles .......................... E04B 1/35
2024/0181673 A1* 6/2024 Petchler .................. B28B 1/001

FOREIGN PATENT DOCUMENTS

CN 113605704 A * 11/2021 ............. E04G 21/04
JP H09228385 9/1997
(Continued)

OTHER PUBLICATIONS

"International Search Report (Form PCT/ISA/210) of PCT/JP2022/012294", mailed on Apr. 19, 2022, with English translation thereof, pp. 1-6.

*Primary Examiner* — Frederick L Lagman
(74) *Attorney, Agent, or Firm* — JCIPRNET

(57) ABSTRACT

Provided is a method of constructing a foundation for a structural body, the foundation including a footing and a pedestal, the method including: a formwork formation step of forming, from concrete or mortar, a formwork being an integrated formwork for the footing and the pedestal by using a 3D printer, and a supplying step of supplying concrete into the formwork. The formwork has such a shape that a horizontal sectional area decreases from the footing toward the pedestal.

6 Claims, 5 Drawing Sheets

(56) References Cited

FOREIGN PATENT DOCUMENTS

| | | |
|---|---|---|
| JP | 2018199940 | 12/2018 |
| JP | 2019111777 | 7/2019 |
| JP | 2020111941 | 7/2020 |
| KR | 20180016100 | 2/2018 |
| KR | 20200017603 | 2/2020 |
| WO | 2021005787 | 1/2021 |

* cited by examiner

METHOD OF CONSTRUCTING FOUNDATION FOR STRUCTURE BODY

CROSS-REFERENCE TO RELATED APPLICATION

This application is a 371 application of the international PCT application serial no. PCT/JP2022/012294, filed on Mar. 17, 2022. The entirety of the above-mentioned patent applications is hereby incorporated by reference herein and made a part of this specification.

TECHNICAL FIELD

The present invention relates to a method of constructing a foundation for a structural body.

BACKGROUND ART

Various kinds of structural bodies are required to be constructed at sites such as a resource development site or a plant construction site. A large sum of initial investment and a long construction period are needed to construct a structural body such as a building, which thus considerably affects overall development. Further, some structural bodies are constructed in a mountainous area or a wildland, which is far from urban areas. Thus, costs and time are required for transport of workers and materials. In addition, it is not easy to secure skilled workers in some cases. Thus, improvements including a reduction in construction period, labor-saving, and quality stabilization have been required.

For example, in Patent Literature 1, there is described a method of extruding concrete from an additive manufacturing apparatus to form a mortar frame around reinforcing bars and further forming a concrete core inside the mortar frame.

CITATION LIST

Patent Literature

[Patent Literature 1] JP 2020-111941 A

SUMMARY OF INVENTION

Technical Problem

According to the proposal made in Patent Literature 1, the following is suggested. Specifically, when a reinforced concrete structural body such as a pier is constructed, a fiber mortar frame is used as a formwork. Thus, even when the formwork is not dismantled and is integrated with the concrete core, earthquake resistance and restorability are improved. However, any particular proposals or suggestions have not been made regarding a foundation for a structural body.

An object of the present invention is to provide a method of constructing a foundation for a structural body, which enables improvements including a reduction in construction period, labor-saving, and quality stabilization in construction of a foundation for a structural body.

Solution to Problem

According to a first aspect of the present invention, there is provided a method of constructing a foundation for a structural body, the foundation including a footing and a pedestal, the method including: a formwork formation step of forming, from concrete or mortar, a formwork being an integrated formwork for the footing and the pedestal by using a 3D printer; and a supplying step of supplying concrete into the formwork. The formwork has such a shape that a horizontal sectional area decreases from the footing toward the pedestal.

According to a second aspect of the present invention, in the first aspect, the supplying step includes supplying the concrete by using the 3D printer.

According to a third aspect of the present invention, in the first or second aspect, the method of constructing a foundation for a structural body further includes: prior to the formwork formation step, a reinforcing bar assembly arrangement step of arranging reinforcing bars for the footing and the pedestal, and the supplying step includes: burying the reinforcing bars with the concrete supplied into the formwork.

According to a fourth aspect of the present invention, in any one of the first to third aspects, further comprising: prior to the supplying step, installing a joint member that enables joint of a structural body arranged above the pedestal with anchor bolts or by welding, and the supplying step includes: burying a part of the joint member with the concrete supplied into the formwork.

According to a fifth aspect of the present invention, in any one of the first to fourth aspects, the method of constructing a foundation for a structural body further includes: a formwork embedding step of pouring an embedding material around the formwork to embed at least a part of the formwork with the embedding material.

According to a sixth aspect of the present invention, in the fifth aspect, the formwork embedding step includes pouring the embedding material by using the 3D printer.

According to a seventh aspect of the present invention, in the fifth or sixth aspect, the method of constructing a foundation for a structural body further includes: an outer frame formation step of forming an outer frame around the formwork by using the 3D printer, and the formwork embedding step includes pouring the embedding material into the outer frame.

Advantageous Effects of Invention

According to the first aspect, the footing and the pedestal can be formed in one integrated step. Thus, improvements including a reduction in construction period, labor-saving, and quality stabilization can be achieved in construction of the foundation for a structural body.

According to the second aspect, further improvements including a reduction in construction period, labor-saving, and quality stabilization can be achieved by using the 3D printer for the supply of the filler to the formwork.

According to the third aspect, the foundation can be reinforced by arranging the reinforcing bars for the footing and the pedestal and burying the reinforcing bars with the concrete.

According to the fourth aspect, the joint member that enables joint of the structural body arranged above the pedestal is installed, and a part of the joint member is buried with the concrete. As a result, the joint member can be more reliably fixed.

According to the fifth aspect, the foundation that can stably support the structural body can be constructed by embedding at least a part of the formwork with the embedding material.

According to the sixth aspect, further improvements including a reduction in construction period, labor-saving, and quality stabilization can be achieved by using the 3D printer for the embedment of the formwork.

According to the seventh aspect, further improvements including a reduction in construction period, labor-saving, and quality stabilization can be achieved by using the 3D printer for the formation of the formwork.

DESCRIPTION OF EMBODIMENTS

Now, the present invention is described based on a preferred embodiment.

<Foundation Structural Body Including Footing and Pedestal>

Figure 6:
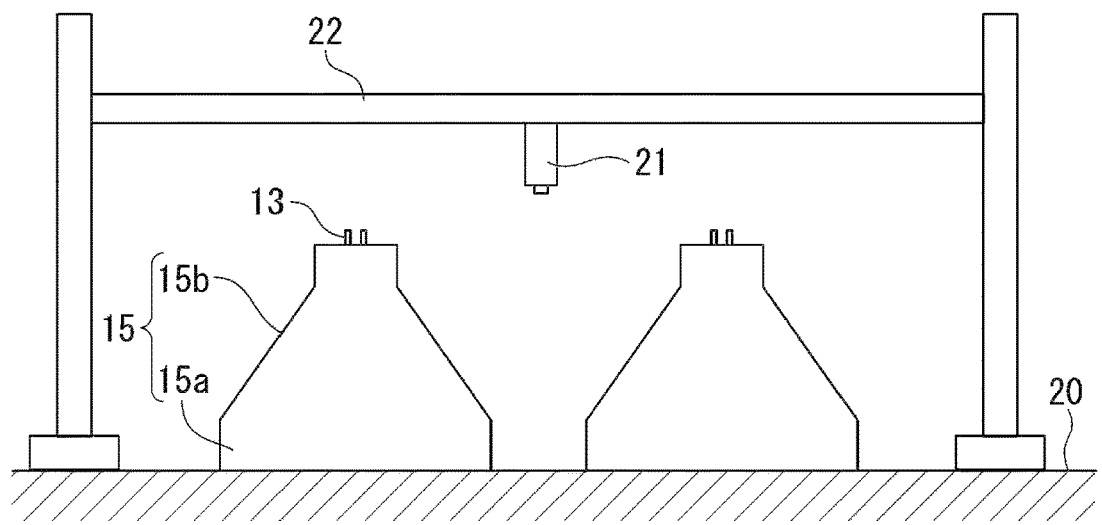
FIG. 6 is an explanatory view for illustrating one example of foundation structural bodies.

A foundation structural body 15 illustrated in FIG. 6 has such a shape that a footing 15a and a pedestal 15b are integrated. The foundation structural body 15 can be constructed substantially through a step of arranging a reinforcing bar assembly 11 illustrated in FIG. 1, a step of forming a formwork 12 illustrated in FIG. 2, and a step of supplying a filler 14 illustrated in FIG. 4. Although not particularly shown, an upper structural body (not shown) is constructed above the pedestal 15b.

The foundation structural body 15 serves as a foundation for the upper structural body. The upper structural body may be various structural bodies and buildings. Although not particularly limited, examples of the upper structural body include a workshop, an office, a factory, a warehouse, a storage facility, a housing, and a passage. A structure of the upper structural body is not limited to a particular structure, and may be a building having walls or pillars or may be a site that can bear a load such as a human, stuff, and a material. A structure material for the upper structural body is not limited to a particular structure material, and examples of the structure material include reinforced concrete, steel, steel-reinforced concrete, wood, stone, and brick.

It is preferred that a ground 20 having a height at which the foundation structural body 15 is to be installed be leveled by digging soil in a planned construction site before a step of constructing the foundation structural body 15 is started. Ground improvement such as dewatering or compaction may be performed as needed.

It is preferred that concrete be placed on a surface of the ground 20 to define a reference level. In order to specify a position at which the foundation structural body 15 or the like is arranged on the ground 20, it is preferred that various reference lines and signs be indicated.

It is preferred that the reinforcing bar assembly 11 be arranged inside the foundation structural body 15. When the reinforcing bar assembly 11 is integrated with concrete being the filler 14, the foundation structural body 15 can have a reinforced concrete structure.

Figure 1:
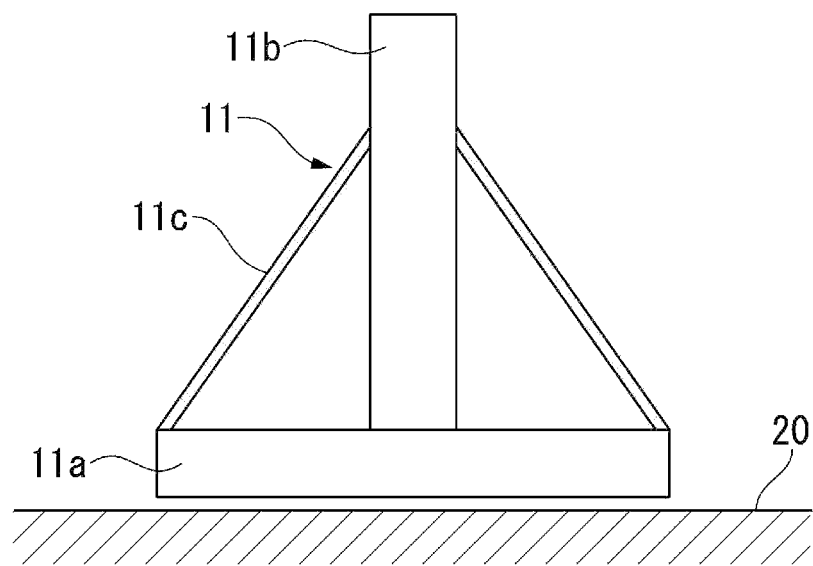
FIG. 1 is an explanatory view for illustrating one example of a reinforcing bar assembly arrangement step.

The reinforcing bar assembly 11 illustrated in FIG. 1 includes a footing part 11a and a pedestal part 11b. The footing part 11a is arranged in proximity to the ground 20. The pedestal part 11b protrudes upward from a center of the footing part 11a. The footing part 11a corresponds to reinforcing bars for the footing 15a, and the pedestal part 11b corresponds to reinforcing bars for the pedestal 15b. Although not particularly shown, a position of the pedestal part 11b may be shifted from the center of the footing part 11a.

A shape and a structure of the reinforcing bar assembly 11 are not limited to particular shape and structure. In general, the reinforcing bar assembly 11 corresponds to a bar-shaped steel material. In place of or in combination with the reinforcing bar assembly 11, a steel-made member having, for example, a frame-like shape, a plate-like shape, a pillar-like shape, a net-like shape, or a grid-like shape may be used. Alternatively, a structure similar to the reinforcing bar assembly 11 may be formed of a combination of two or more kinds of steel-made members. A horizontal sectional shape of the footing part 11a is not limited to a particular shape, and may be, for example, circular, rectangular, or polygonal.

It is preferred that the pedestal part 11b be maintained to be perpendicular to the ground 20. In order to reinforce the pedestal part 11b at a time of, for example, fixing of joint members 13, the reinforcing bar assembly 11 may include a reinforcement member 11c. With the reinforcement member 11c, even when the reinforcing bar assembly 11 is manufactured with a simple structure or is made of a simple material, the pedestal part 11b can be supported stably on the footing part 11a. The reinforcement member 11c may be inclined so as to connect a peripheral edge portion of the footing part 11a and an upper part of the pedestal part 11b to each other. A plurality of reinforcement members 11c may be arranged at equal or predetermined intervals around the pedestal part 11b.

The footing 15a has a larger horizontal sectional area than a horizontal sectional area of the pedestal 15b. Because of a larger contact area of the footing 15a with the ground 20 allows a load of the structural body to be effectively transferred to the ground to thereby achieve stability. It is preferred that the footing 15a have such a shape that allows uniform contact with the ground 20. For example, in the supplying step described later, it is preferred that the filler 14 be supplied between the footing part 11a and the ground 20. In this manner, the footing 15a can be held in close contact with the ground 20.

Although not particularly shown, spacers made of, for example, mortar, wood, or stone may be partially arranged below the footing part 11a so as to maintain a gap between the footing part 11a of the reinforcing bar assembly 11 and the ground 20. In this manner, the filler 14 can easily be supplied between the footing part 11a of the reinforcing bar assembly 11 and the ground 20.

The formwork 12 according to the embodiment is an integrated formwork for the footing 15a and the pedestal 15b. More specifically, the formwork 12 includes a footing formwork 12a and a pedestal formwork 12b. The footing formwork 12a corresponds to a formwork for the footing 15a. The pedestal formwork 12b corresponds to a formwork for the pedestal 15b.

Figure 2:
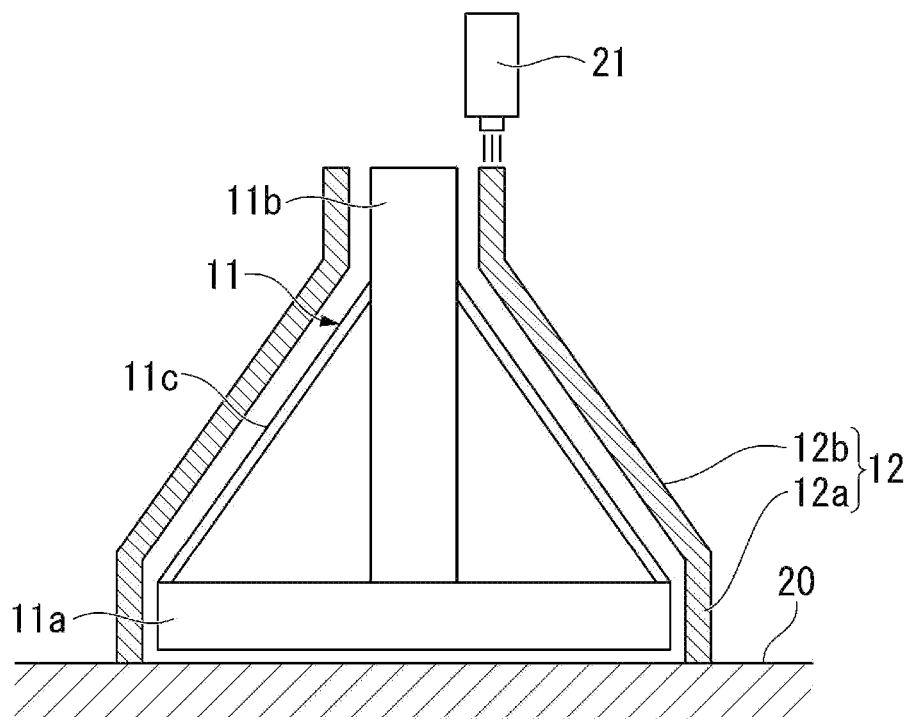
FIG. 2 is an explanatory view for illustrating one example of a formwork formation step.
Figure 4:
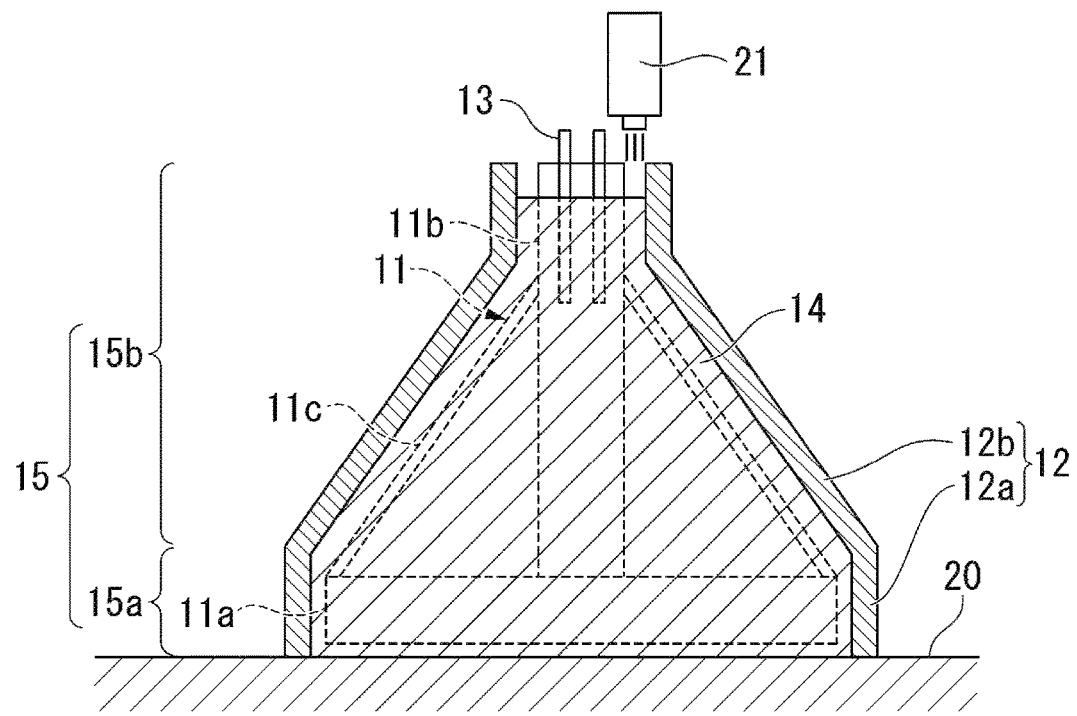
FIG. 4 is an explanatory view for illustrating one example of a supplying step.

In the step of forming the formwork 12, as illustrated in FIG. 2, the footing formwork 12a and the pedestal formwork 12b are formed integrally by using a three-dimensional (3D) printer 21. A material for forming the formwork 12 is concrete or mortar. Further, as illustrated in FIG. 4, a part serving as a core of the foundation structural body 15 is formed by supplying the filler 14 such as concrete into the formwork 12.

Similarly to the reinforcing bar assembly 11, a related-art foundation structural body including a footing and a pedestal often has an inverted T-like shape. When a structural body having an inverted T-like shape is made of concrete by a related-art technique, (a) a step of forming a footing formwork, (b) a step of supplying concrete into the footing formwork to form a footing, (c) a step of forming a pedestal formwork on the footing, and (d) a step of supplying concrete into the pedestal formwork to form a pedestal, are required to be carried out in the stated order. Thus, the related-art foundation structural body has a problem in that it is difficult to reduce a construction period.

In a case of the foundation structural body 15 according to the embodiment, the footing 15a and the pedestal 15b are formed integrally by using the formwork 12 including the footing formwork 12a and the pedestal formwork 12b that are formed integrally. This configuration allows a construction period to be significantly reduced. Further, the filler 14 for forming the footing 15a and the filler 14 for forming the pedestal 15b are hardened integrally. Thus, for example, a joint failure between the footing 15a and the pedestal 15b is less likely to occur.

A construction method according to this embodiment may include: (1-1) a formwork formation step of forming the footing formwork 12a and the pedestal formwork 12b in a single step; and (1-2) a supplying step of supplying the filler 14 into the formwork 12 to form the footing 15a and the pedestal 15b.

Further, (2-1) a step of forming the footing formwork 12a on the ground 20, (2-2) a step of forming the pedestal formwork 12b on the footing formwork 12a, and (2-3) a step of supplying the filler 14 into the formwork 12 to form the footing 15a and the pedestal 15b, may be carried out in the stated order.

The 3D printer 21 can form a structural body having a height by forming a discharged material in a layer having a given thickness and sequentially forming the layers in a laminate. A step of discharging a material from the 3D printer 21, which is started at a lower part of the footing formwork 12a, may be continuously carried out until an upper part of the pedestal formwork 12b is formed. However, the discharging step is not limited to the above-mentioned case. Work may be interrupted during the step of forming the formwork 12.

When work is interrupted during the step of forming the formwork 12, it is preferred that the material be covered to implement measures to suppress drying shrinkage. For example, when work is interrupted while the material is being discharged from the 3D printer 21 to form a lower part of the formwork 12, a concrete curing compound may be applied or a retarding admixture may be spread. When a material for forming a part of the formwork 12 is first hardened and a material for a remaining part is discharged after the part of the material is hardened, chipping, high-pressure water cleaning, application of an adhesive, or the like may be performed on a surface of the hardened material.

The formwork 12 according to the embodiment is shaped such that its horizontal sectional area decreases from the footing 15a toward the pedestal 15b. Thus, when the footing formwork 12a and the pedestal formwork 12b are formed integrally, a difference in shape between the footing 15a and the pedestal 15b can be reduced. It is preferred that, for example, the pedestal formwork 12b have a tapered shape such as a conical shape or a pyramidal shape.

The footing formwork 12a of the illustrated example is formed perpendicularly to the ground 20. Although not particularly shown, the footing formwork 12a may have a portion inclined with respect to the ground 20. Further, the pedestal formwork 12b of the illustrated example except for its upper part has an inclined shape with respect to the ground 20. The pedestal formwork 12b may have a part perpendicular to the ground 20. Further, the entire pedestal formwork 12b from the lower part to the upper part may have a shape inclined with respect to the ground 20.

The use of the formwork 12 including the footing formwork 12a and the pedestal formwork 12b that are formed integrally enables formation of the footing 15a and the pedestal 15b in one integrated step. Thus, improvements including a reduction in construction period, labor-saving, and quality stabilization can be achieved in construction of the foundation structural body 15.

Further, the upper part of the formwork 12 has a smaller horizontal sectional area. Thus, as described above, the reinforcing bar assembly 11 is installed on the ground 20 prior to the step of forming the formwork 12. The formwork 12 may be formed by using the 3D printer 21 around the reinforcing bar assembly 11. In this case, the reinforcing bar assembly 11 except for a part of the pedestal part 11b is surrounded by the formwork 12. Thus, the pedestal formwork 12b having a horizontal sectional area smaller than that of the footing part 11a of the reinforcing bar assembly 11 can be formed.

Although not particularly shown, the formwork 12, which has been formed by using the 3D printer at a different location, can be transported and placed around the reinforcing bar assembly 11 so as to be installed on the ground 20.

As illustrated in FIG. 4, in the step of supplying the filler 14, reinforcing bars of the reinforcing bar assembly 11 are buried with concrete that is used as the filler 14. As a result, reinforcing bars for the footing 15a and reinforcing bars for the pedestal 15b can be arranged integrally. The foundation structural body 15 is made of reinforced concrete. Thus, the foundation structural body 15 can be reinforced.

A mixture of, for example, cement, water, a fine aggregate, and a coarse aggregate is used as concrete. A mixture of, for example, cement, water, and a fine aggregate is used as mortar. A desired admixture material may be added to concrete or mortar as needed. Examples of the fine aggregate include sand and crushed sand. Examples of the coarse aggregate include gravel and crushed stone. Slag, a recycled aggregate, or the like may be used as an aggregate. These aggregates may be classified into a fine aggregate or a coarse aggregate in accordance with a particle diameter.

Any of concrete and mortar may be used as a material of the formwork 12. When the formwork 12 is formed by using the 3D printer 21, concrete or mortar is discharged in an unhardened state.

The formwork 12 includes a part inclined with respect to the ground 20. Thus, it is preferred that a material of the formwork 12 in an unhardened state after being discharged from the 3D printer 21 have low fluidity. When a vertical direction is set to 0° and a horizontal direction is set to 90°, an inclination angle of a part of the formwork 12, which has a shape with a decreasing horizontal sectional area, is only required to be larger than 0°, and may be, for example, about 10°, about 15°, about 20°, or about 25°.

A method of supplying the filler 14 is not limited to a particular method. The supply of the filler 14 may be implemented using the 3D printer 21. The use of the 3D printer 21 can achieve improvements including a reduction in construction period, labor-saving, and quality stabilization in the supply of the filler 14. The supply of the filler 14 may be implemented by using, for example, a concrete pumping truck as means other than the 3D printer 21. The formation of the formwork 12 by using the 3D printer 21 and the supply of the filler 14 by using other means may be performed at different locations to simultaneously proceed.

When the filler 14 is supplied into the formwork 12 by using the 3D printer 21, a concrete pumping truck, or the like, concrete is discharged in an unhardened state. It is preferred that a material of the filler 14 have high fluidity so that the filler 14 is fully supplied into the formwork 12 having a shape with a decreasing horizontal sectional area.

In order to eliminate the need for compaction of the filler 14 after the supply of the filler 14 into the formwork 12, it is preferred that self-compacting concrete (so-called "high-fluidity concrete") be used as the filler 14. A material having both high fluidity and material segregation resistance, which is obtained by mixing an appropriate chemical admixture, may be used as self-compacting concrete.

A water content, an admixture material, or the like may be set different for the filler 14 and a material of the formwork 12 so that the filler 14 and the material of the formwork 12 have a difference in fluidity. The filler 14 may have a composition similar to a composition of concrete that is used to form a formwork by a related-art method. A chemical admixture, fiber, or the like may be added to the material of the formwork 12 so that the material of the formwork 12 has fluidity lower than that of the filler 14.

As described above, the upper structural body (not shown) can be joined to the foundation structural body 15. Thus, it is preferred that the joint members 13 to be used for joint to the upper structural body be buried in the concrete being the filler 14. In this manner, the foundation structural body 15 and the upper structural body can easily be jointed together.

Figure 3:
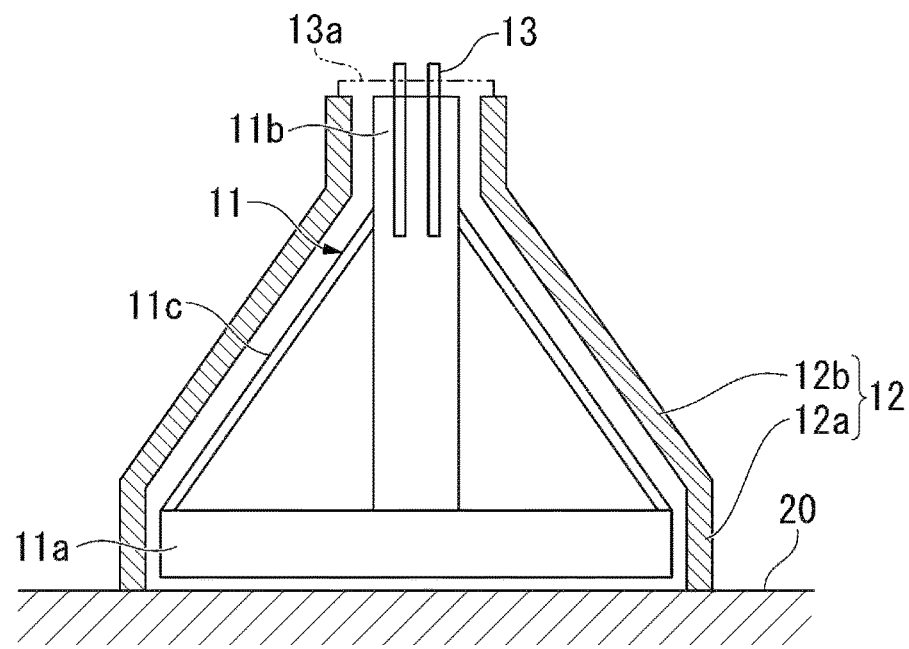
FIG. 3 is an explanatory view for illustrating one example of a joint member installation step.
Figure 5:
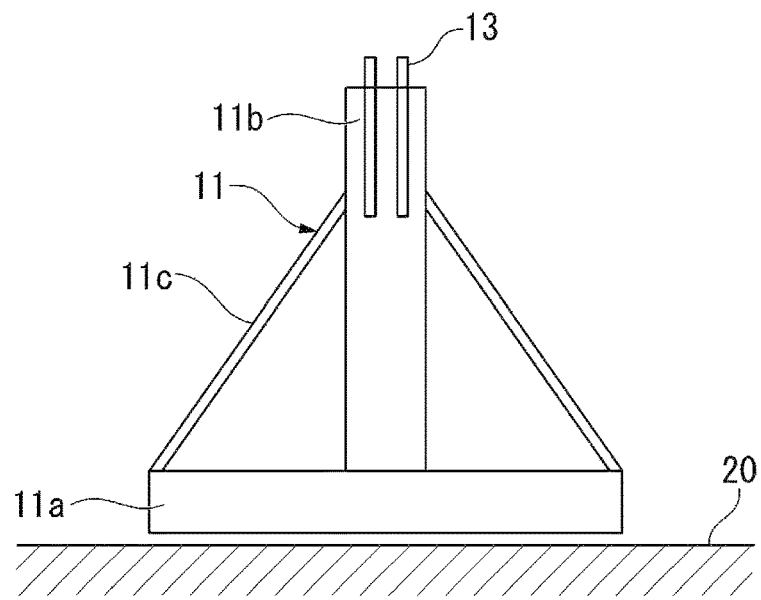
FIG. 5 is an explanatory view for illustrating one example in which joint members are fixed to a reinforcing bar assembly.

The foundation structural body 15 of the illustrated example includes the joint members 13 provided in an upper part of the pedestal 15*b*. The installation of the joint members 13 may be implemented after the formation of the formwork 12 as illustrated in FIG. 3 or may be implemented before the formation of the formwork 12 as illustrated in FIG. 5.

The joint members 13 can be used to join the upper structural body with, for example, anchor bolts or through welding. The joint members 13 are only required to have a function of joining a structural member to be used for the upper structural body, for example, a steel frame, a wooden material, a pillar, or an exterior wall. When a steel frame of the upper structural body is joined to the foundation structural body 15, the joint members 13 may be, for example, metal plates that can be welded to the steel frame.

The reinforcing bar assembly 11 may have a function of fixing the joint members 13. When the joint members 13 are installed after the formation of the formwork 12 as illustrated in FIG. 3, a template 13*a* may be installed between the formwork 12 and the joint member 13 so as to fix a positional relationship of the joint members 13 with respect to the reinforcing bar assembly 11 or the formwork 12.

An identifier may be assigned to the joint members 13 or the template 13*a* so as to identify information regarding, for example, joint of the upper structural body. Examples of the identifier include a tag plate and a radio frequency identification (RFID). The identifier may be data identified through, for example, wireless communication, a code such as a barcode or a two-dimensional code identified by a machine, or an indication such as a character, a numeric character, a sign, or a graphic which is visually recognizable.

When the template 13*a* is used to hold the joint members 13, the joint members 13 are not required to be fixed to the reinforcing bar assembly 11. Although not particularly shown, the template 13*a* can be installed between the reinforcing bar assembly 11 and the joint members 13 also when the joint members 13 are installed before the formation of the formwork 12 as illustrated in FIG. 6.

When the template 13*a* is installed, it is preferred that the template 13*a* maintain positions of the joint members 13 until a part of the joint members 13 is buried in the filler 14. The template 13*a* is not illustrated in FIG. 4. It is preferred that a state in which the template 13*a* is mounted to the joint members 13 be maintained until the filler 14 is hardened.

It is preferred that the template 13*a* be removed from the formwork 12 after the filler 14 is hardened. Thus, even when the template 13*a* having a simple structure with low strength is used, effects of the template 13*a* on the structural body can be ignored to thereby make designing easier. In view of the removal of the template 13*a*, it is preferred that the template 13*a* be provided to an upper part of the joint members 13 so that the template 13*a* is not buried in the filler 14.

A material of the template 13*a* is not limited to a particular one, and one or two of reinforcing steel, wood, a resin, concrete, a stone material, and brick can be used. When the template 13*a* is made of a resin, the template 13*a* may be formed by using a 3D printer (not shown) for resin.

When the template 13*a* is fixed to the formwork 12, the joint members 13 may be held so as not to be in contact with the reinforcing bar assembly 11. Thus, even when the reinforcing bar assembly 11 has an error in, for example, dimensions or shape, the joint members 13 are positioned with respect to the formwork 12 through intermediation of the template 13*a*. When joint strength between the joint members 13 and the reinforcing bar assembly 11 is to be increased, the joint members 13 may be fixed to the reinforcing bar assembly 11, for example, with an instrument or by bonding.

A part of the joint members 13, which is necessary for fixing of the joint members 13, is buried with the filler 14. A joint part of the joint members 13 to the upper structural body protrudes upward beyond the filler 14. Although not particularly shown, the joint members 13 are only required to be exposed on their upper side and are not required to protrude upward beyond the filler 14 or protrude beyond an upper end of the formwork 12. Plates serving as the joint members 13 may be buried after welding connection is performed.

It is preferred that anchor bolts used as the joint members 13 be integrated with concrete while being buried in unhardened concrete that is supplied as the filler 14. Although not particularly shown, post-installed anchor bolts can also be used. In this case, anchor bolts are provided after the filler 14 is hardened.

When the formwork 12 is formed by using the 3D printer 21, design data that shows a shape of the formwork 12 is prepared in advance. The 3D printer 21 discharges a material to a predetermined position in accordance with the design data to thereby form a structural body. When a plurality of foundation structural bodies 15 are to be constructed based on the same design, the formwork 12 can be repeatedly formed by using the same design data.

For easier control on a position at which the 3D printer 21 performs discharge, the 3D printer 21 may be supported by a support body such as a gantry 22 as illustrated in FIG. 6. The gantry 22 is guided by a rail extending in a predetermined direction so as to be able to guide the position at which the 3D printer 21 performs discharge to a desired position within a range of the rail. Although not particularly shown, the 3D printer 21 may be operated by using, for example, a robotic arm or a crane.

<Formation of Outer Frame and Embedment of Formwork>

Figure 7:
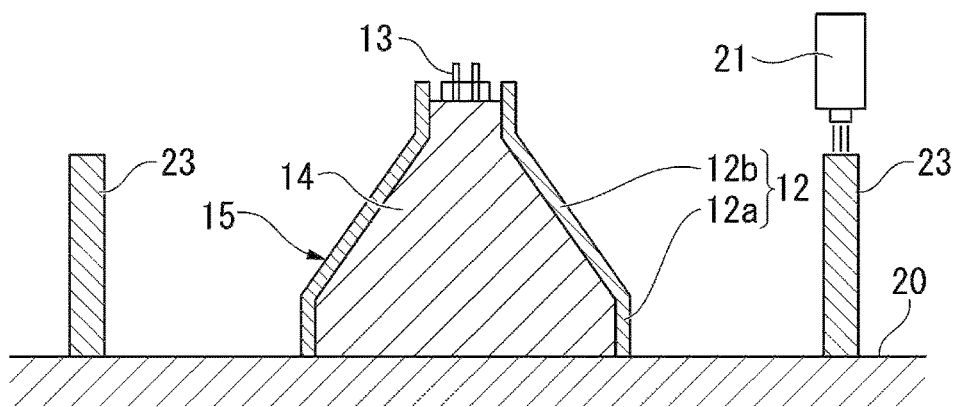
FIG. 7 is an explanatory view for illustrating one example of an outer frame formation step.
Figure 8:
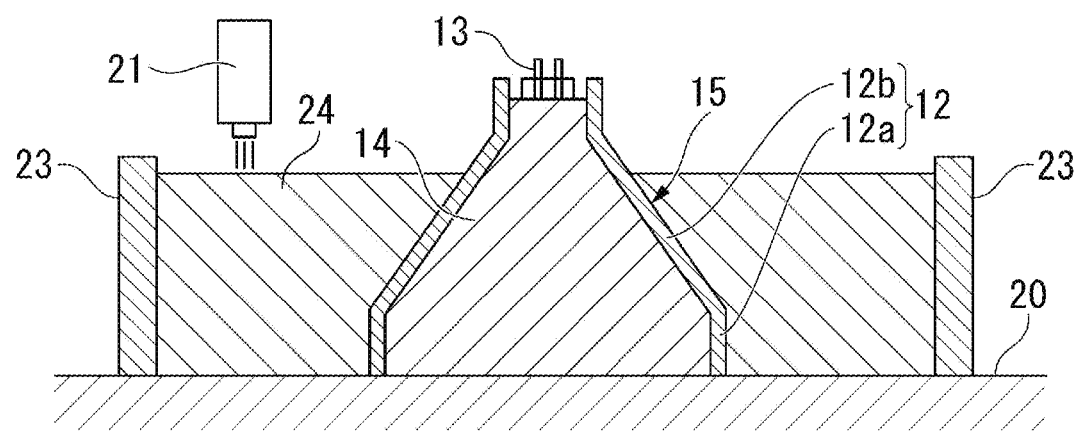
FIG. 8 is an explanatory view for illustrating one example of a formwork embedding step.

In order to embed the foundation structural body 15 that is formed by using the formwork 12, formation of an outer frame 23 around the formwork 12 as illustrated in FIG. 7 may be followed by pouring of an embedding material 24 into the outer frame 23 by using the 3D printer 21 as illustrated in FIG. 8. The formwork 12 is not required to be removed, and thus improvements including a reduction in construction period, labor-saving, and quality stabilization can be achieved. When the embedding material 24 is poured to a level difference or over a range of a slope, which is formed when the ground 20 is dug down, the formation of the outer frame 23 may be skipped.

A material, a construction method, or the like for the outer frame 23 is not limited to a particular one. The outer frame 23 may be formed by using the 3D printer 21. The use of the 3D printer 21 enables improvements including a reduction of construction period, labor-saving, and quality stabilization in the formation of the outer frame 23. A material of the outer frame 23 is not limited to a particular one. Examples of the material of the outer frame 23 include concrete and mortar.

It is preferred that the outer frame 23 have a wall-like structure that is formed so as to deter outflow of the embedding material 24. In order to reinforce the outer frame 23, retaining walls may be provided to side surfaces of the outer frame 23, and, for example, a cantilever baseplate may be provided to a lower part of the outer frame 23.

A relationship of a formation time of the outer frame 23 with respect to a construction time of the foundation structural body 15 is not limited to a particular one. The outer frame 23 may be formed before the formation of the formwork 12, during the formation of the formwork 12, after the formation of the formwork 12, after the supply of the filler 14 into the formwork 12, or after the completion of the foundation structural body 15 after the filler 14 is hardened.

It is preferred that the foundation structural body 15 be installed on the ground 20 that is located underground as a result of digging. Further, in order that the upper structural body may be stably supported on the foundation structural body 15, it is preferred that at least a part of the foundation structural body 15 be embedded with the embedding material 24.

The embedding material 24 is not limited to a particular one. Examples of the embedding material 24 include concrete, mortar, soil, and sand. A mixture of two or more kinds of the embedding material 14 may be used. Soil and sand obtained as a result of drilling of the ground 20 before the construction may be used at least for a part of the embedding material 24.

A method of providing the embedding material 24 is not limited to a particular one. The embedding material 24 may be poured by using the 3D printer 21. The use of the 3D printer 21 enables improvements including a reduction in construction period, labor-saving, and quality stabilization in the embedment of the foundation structural body 15. For example, the embedding material 24 may be poured by using, for example, a concrete pumping truck as means other than the 3D printer 21.

The embedding material 24 may be poured after the filler 14 is hardened to complete the foundation structural body 15. After the formwork 12 is hardened, the embedding material 24 can be poured around the formwork 12 even before the filler 14 is supplied into the formwork 12. When the formation of the outer frame 23 and the pouring of the embedding material 24 are implemented before the completion of the foundation structural body 15, a construction period can be further reduced.

The outer frame 23 and the embedding material 24 are only required to be arranged at necessary positions around the formwork 12, and are not required to be arranged over the entire area on which the upper structural body is constructed. The outer frame 23 and the embedding material 24 are not arranged in an area in which, for example, a pipe or a cable is laid, and a space may be secured underground in the area.

A depth to which the embedding material 24 is poured inside the outer frame 23 may be equal to a height of the outer frame 23. Further, the pouring of the embedding material 24 may be terminated at a position lower than the height of the outer frame 23.

Figure 9:
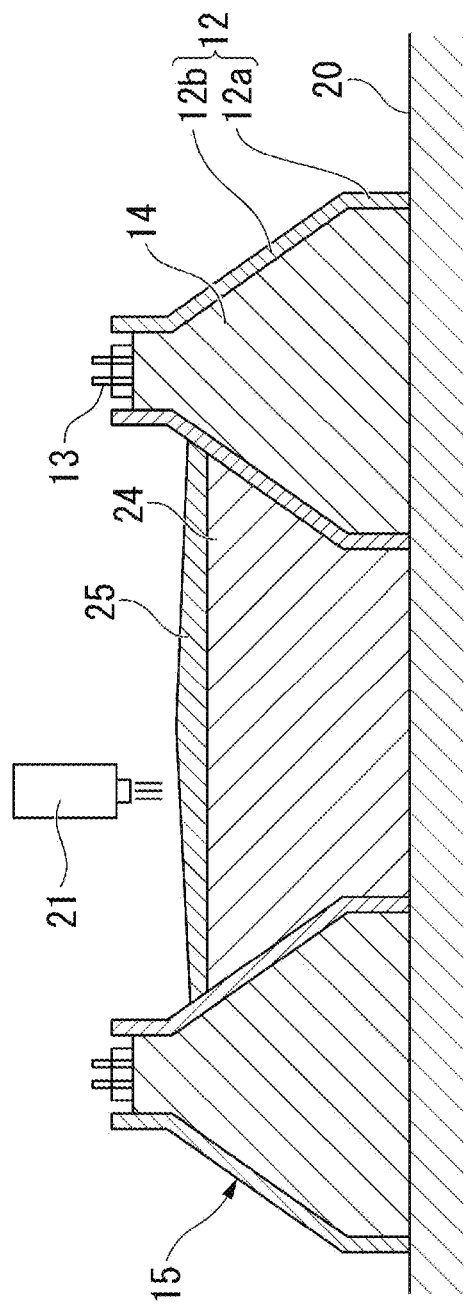
FIG. 9 is an explanatory view for illustrating one example of a paving step.

As illustrated in FIG. 9, a paving material 25 may be laid on the embedding material 24. A flowable material such as concrete or mortar may be discharged as the paving material 25 from the 3D printer 21. In this manner, improvements including a reduction in construction period, labor-saving, and quality stabilization can be achieved in laying of the paving material 25. The paving material 25 may have a gradient toward an appropriate direction so as to improve water drainage.

In FIG. 9 in which the outer frame 23 is not shown, there is illustrated an example in which the paving material 25 is laid between the foundation structural bodies 15. Although not particularly shown, the paving material 25 may be laid until it reaches the outer frame 23.

Further, although not particularly shown, an upper surface of the embedding material 24 may be paved with use of, for example, concrete, asphalt, tiles, and brick. For paving using the materials described above, a method different from the 3D printer 21 may be used.

The present invention has been described above based on the preferred embodiment. The present invention is not limited to the embodiment described above, and various modifications are possible without departing from the gist of the present invention. The modifications include addition, replacement, and omission of a component and other changes in each embodiment.

INDUSTRIAL APPLICABILITY

A purpose of use of the foundation structural body that is constructed according to the present invention is not limited to a particular one. The foundation structural body can be used for various kinds of structural bodies and buildings at a site such as a resource exploitation site or a plant construction site.

REFERENCE SIGNS LIST

11 . . . reinforcing bar, 11a . . . footing part, 11b . . . pedestal part, 11c . . . reinforcement member, 12 . . . formwork, 12a . . . footing formwork, 12b . . . pedestal formwork, 13 . . . joint member, 13a . . . template, 14 . . . filler, 15 . . . foundation structural body, 15a . . . footing, 15b . . . pedestal, 20 . . . ground, 21 . . . 3D printer, 22 . . . gantry, 23 . . . outer frame, 24 . . . embedding material, 25 . . . paving material

The invention claimed is:

1. A method of constructing a foundation for a structural body, the foundation including a footing and a pedestal, the method comprising:
   a reinforcing bar assembly arrangement step of arranging a reinforcing bar assembly for the footing and the pedestal;
   a formwork formation step of forming, from concrete or mortar, a formwork being an integrated formwork for the footing and the pedestal by using a 3D printer; and
   a supplying step of supplying concrete into the formwork to bury the reinforcing bar assembly,
   wherein the reinforcing bar assembly includes a footing part, a pedestal part protruding upward from the footing part, and a reinforcement member being inclined so as to connect a peripheral edge portion of the footing part and an upper part of the pedestal part, and
   wherein the formwork has such a shape that a horizontal sectional area decreases from the footing toward the pedestal around the reinforcing bar assembly.

2. The method of constructing a foundation for a structural body according to claim 1, wherein
   the supplying step comprises: supplying the concrete by using the 3D printer.

3. The method of constructing a foundation for a structural body according to claim 1, further comprising:
   prior to the supplying step, installing a joint member that enables joint of a structural body arranged above the pedestal with anchor bolts or by welding, and
   wherein the supplying step comprises: burying a part of the joint member with the concrete supplied into the formwork.

4. The method of constructing a foundation for a structural body according to claim 1, further comprising:
   a formwork embedding step of pouring an embedding material around the formwork to embed at least a part of the formwork with the embedding material.

5. The method of constructing a foundation for a structural body according to claim 4, wherein
   the formwork embedding step comprises: pouring the embedding material by using the 3D printer.

6. The method of constructing a foundation for a structural body according to claim 4, further comprising:
   an outer frame formation step of forming an outer frame around the formwork by using the 3D printer,
   wherein the formwork embedding step comprises: pouring the embedding material into the outer frame.

* * * * *